(No Model.)

W. W. CAREY.
SELF LUBRICATING DEVICE FOR PULLEYS.

No. 444,812. Patented Jan. 20, 1891.

Witnesses
Alice A. Perkins
Geo. W. White

Inventor
Wilson W. Carey
by Allan Andrew his atty.

THE NORRIS PETERS CO., PHOTO-LITHO., WASHINGTON, D. C.

UNITED STATES PATENT OFFICE.

WILSON W. CAREY, OF LOWELL, MASSACHUSETTS.

SELF-LUBRICATING DEVICE FOR PULLEYS.

SPECIFICATION forming part of Letters Patent No. 444,812, dated January 20, 1891.

Application filed May 12, 1890. Serial No. 351,579. (No model.)

*To all whom it may concern:*

Be it known that I, WILSON W. CAREY, a citizen of the United States, and a resident of Lowell, in the county of Middlesex and State of Massachusetts, have invented new and useful Improvements in Self-Lubricating Devices for Pulleys, of which the following, taken in connection with the accompanying drawings, is a specification.

This invention relates to improvements in self-lubricating devices for pulleys running loose on the shaft on which they are journaled, and it is carried out as follows, reference being had to the accompanying drawings, wherein—

Figure 1:
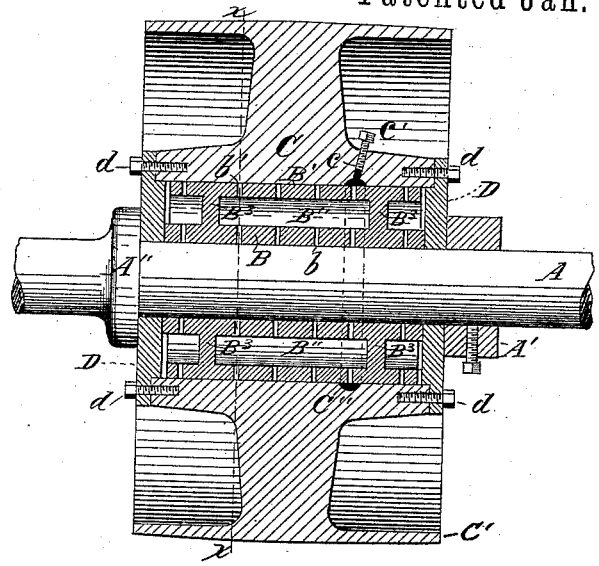
Figure 2:
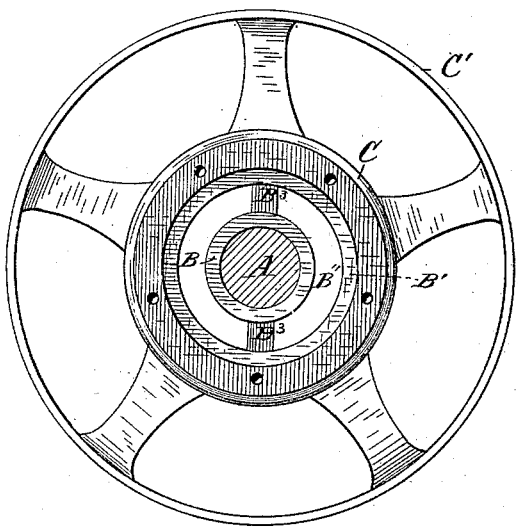
Figure 3:
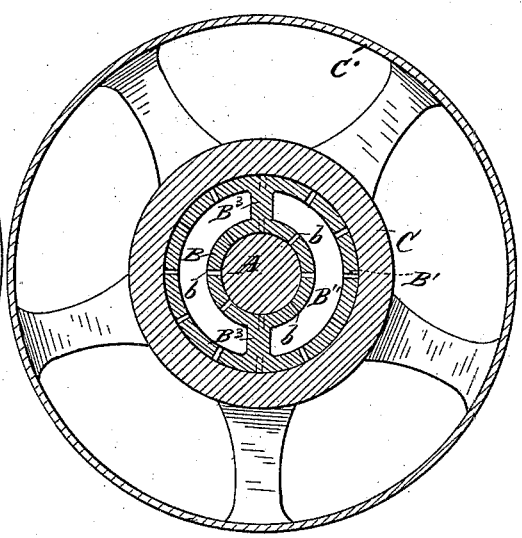

Figure 1 represents a sectional view of a pulley provided with my improved self-lubricating device. Fig. 2 represents an end view thereof, showing the cap-plate as removed; and Fig. 3 represents a transverse section on the line X X shown in Fig. 1.

Similar letters refer to similar parts wherever they occur on the different parts of the drawings.

In the drawings, A is the shaft on which the lubricating device is arranged, said device consisting of an interior sleeve B, loosely journaled on said shaft and having attached to or cast in one piece with it a cylindrical exterior shell B', between which and the interior sleeve B is left an annular oil-chamber B'', as shown.

B³ B³ are radial arms connecting the interior and exterior cylindrical sleeves or shells B B', as shown in the drawings.

C is the hub of the pulley C', which hub is bored out to receive the shell B', on which it is loosely journaled, so as to turn freely thereon. The ends of the hub C are closed by means of cap-plates or covers D D, which are secured to the opposite ends of such hub, preferably by means of screws $d$ $d$ or equivalent or well-known means. Each of said cap-plates or covers has a central perforation, through which the shaft A passes loosely, and said covers serve to prevent the oil or lubricant in the annular oil-chamber B'' from escaping at the ends of the pulley-hub, as shown in Fig. 1. The pulley is prevented from longitudinal motion on the shaft A by means of a set-collar A' at one end and a collar or fast pulley A'' at the other end, such parts A' and A'' being secured in a suitable manner to the shaft A, as usual.

$b$ $b$ $b$ are radial perforations going entirely through the interior sleeve B, and $b'$ $b'$ $b'$ are similar perforations going through the exterior shell B', as shown, for the purpose of allowing the lubricant in the annular oil-chamber B to reach the shaft A and bore of the pulley-hub C, and thus causing the sleeve B to be properly lubricated where it is journaled on the axle A as well as the pulley-hub C, where it runs on the exterior sleeve B'.

In practice I prefer to make the central sleeve B a little longer than the exterior shell B', as shown in Fig. 1, and said sleeves or shells are prevented from longitudinal movement relative to the pulley-hub by the end plates D D coming in contact with the ends of the said central sleeve B, as shown in Fig. 1.

For the purpose of filling the chamber B'' with the lubricant, I make preferably through the pulley-hub C a perforation $c$, which is normally closed by means of a cap-screw $c'$, and in connection with such filling-perforation $c$ I prefer to make an annular groove or recess C'' on the interior of the bored-out pulley-hub, as shown in Fig. 1. It will thus be seen that by having the sleeve B properly lubricated and loosely journaled on the shaft A and the pulley-hub C similarly lubricated and loosely journaled on the shell B' the pulley C' may be rotated upon the shaft A with a minimum of frictional resistance.

When the pulley is held stationary, the gravity of the lubricant will cause it to reach the shaft A through the perforations $b$ $b$ $b$, and during the rotation of the shell or sleeves B B' the oil will be forced by centrifugal force through the perforations $b'$ $b'$ $b'$ between the exterior surface of the shell B' and bore of the hub C, thus keeping said parts at all times perfectly lubricated.

Having thus fully described the nature, construction, and operation of my invention, I wish to secure by Letters Patent and claim—

The improved pulley self-lubricating device, consisting of a perforated central shell or sleeve B, loosely journaled on the axle, and an exterior perforation shell or sleeve B', connected to the former and having an annular oil-chamber B'' arranged between said sleeves, combined with the pulley-hub C, loosely journaled on the sleeve B', and cap-plates or covers D D, secured to the ends of the pulley-hub, substantially as and for the purpose set forth.

In testimony whereof I have signed my name to this specification, in the presence of two subscribing witnesses, on this 2d day of May, A. D. 1890.

WILSON W. CAREY.

Witnesses:
ALBAN ANDRÉN,
ALICE A. PERKINS.